(12) United States Patent
Mori

(10) Patent No.: US 8,117,835 B2
(45) Date of Patent: Feb. 21, 2012

(54) GASKET

(75) Inventor: Shingo Mori, Toyota (JP)

(73) Assignee: Nippon Gasket Co., Ltd., Aichi (JP)

( * ) Notice: Subject to any disclaimer, the term of this patent is extended or adjusted under 35 U.S.C. 154(b) by 962 days.

(21) Appl. No.: 12/150,195

(22) Filed: Apr. 25, 2008

(65) Prior Publication Data

US 2008/0265524 A1    Oct. 30, 2008

(30) Foreign Application Priority Data

Apr. 26, 2007  (JP) ................................. 2007-116732
Apr. 4, 2008  (JP) ................................. 2008-098050

(51) Int. Cl.
*F01N 3/10* (2006.01)
(52) U.S. Cl. ............. 60/304; 60/322; 277/597; 277/598
(58) Field of Classification Search .................... 60/304, 60/320, 322; 277/592, 594, 597, 598
See application file for complete search history.

(56) References Cited

U.S. PATENT DOCUMENTS

| 5,330,200 A * | 7/1994 | Unseth ........................ 277/592 |
| 6,811,159 B2 * | 11/2004 | Kerchner ...................... 277/635 |
| 2003/0159354 A1 * | 8/2003 | Edlund et al. ................ 48/127.9 |
| 2005/0140075 A1 * | 6/2005 | Mishima ................. 267/140.11 |

FOREIGN PATENT DOCUMENTS

| JP | 09-189222 | 7/1997 |
| JP | 2002-276358 | 9/2002 |
| JP | 2004162682 A * | 6/2004 |

* cited by examiner

*Primary Examiner* — Thomas Denion
*Assistant Examiner* — Patrick Maines
(74) *Attorney, Agent, or Firm* — Jordan and Hamburg LLP

(57) ABSTRACT

A gasket resistant to vibration and noise generation is interposed between a cylinder head and an exhaust manifold of an engine. The gasket includes a gasket main body interposed between a cylinder head and an exhaust manifold of an engine, a base plate affixed to the gasket main body and having a heat shielding portion integral with a base portion and extending to a side of the exhaust manifold, and a reinforcement plate fixed to the heat shielding portion, in which the reinforcement plate is not present at a region of the base portion in contact with the gasket main body, and a reinforcement rib is formed at the region of the base portion in contact with the reinforcement plate and a region of the heat shielding portion in contact with the reinforcement. The base portion is provided with a projected portion projected into a path of introducing secondary air from a side wall of the cylinder head to an exhaust port.

6 Claims, 6 Drawing Sheets

GASKET

TECHNICAL FIELD

The present invention relates to an exhaust manifold gasket interposed between an engine and an exhaust manifold.

BACKGROUND OF THE INVENTION

In a background art, there is known an exhaust system structure of an engine of covering an exhaust manifold by an insulator in order to prevent heat radiated from the exhaust manifold from effecting an influence on a part arranged at a surrounding thereof.

However, when the exhaust manifold is covered by the insulator, heat is confined at inside thereof, and therefore, it is necessary to radiate the heat at inside of the insulator to outside thereof, however, when the heat is radiated to outside of the insulator from a vicinity of a portion of attaching the exhaust manifold to the engine, there poses a problem that a cylinder head gasket interposed between a cylinder head and a cylinder head cover constituting the engine or a member present at a surrounding thereof is thermally deteriorated.

Hence, as shown by FIG. 4, there is proposed a structure providing a clearance S for radiating heat between an engine 104 at a vicinity of an attaching portion of an exhaust manifold 102 and an insulator 106 and providing a heat shielding portion 112 of shielding heat by guiding heat from the clearance S in a direction of being remote from the engine 104 and reaching the engine 104 (refer to, for example, JP-A-2002-276358).

There is a case in which the heat shielding portion 112 is integrally provided to an exhaust manifold gasket 110 interposed between the exhaust manifold 102 and the engine 104 in order to achieve a reduction in a number of parts and a number of integrating steps.

The exhaust manifold gasket 110 includes a gasket main body 114 comprising a metal plate having an elasticity of stainless steel or the like and shielding a bonding face of the engine 104 and the exhaust manifold 102, and a base plate 116 comprising a metal plate of a steel plate or the like and fixing the gasket main body 114, the heat shielding portion 112 is extended integrally from the base plate 116 to a side of the exhaust manifold 104, and therefore, there is a concern of vibrating the heat shielding portion 112 extended in a flange-like shape by a vibration generated from the engine 102 and generating noise, which is problematic.

In addition thereto, meanwhile, there is a case of providing a secondary air supply apparatus of supplying secondary air to an exhaust system of an engine in order to promote oxidation of an exhaust gas.

As shown by FIG. 5, the apparatus 120 is constituted to supply secondary air cleaned by an air cleaner or the like to a secondary air introducing path 123 by way of a secondary air supply flow path 124 by an electric type air pump or the like and introduce the secondary air from the secondary air introducing path 123 to an exhaust port 122 of an engine 125.

The secondary air introducing path 123 is formed as a through hole penetrating from a side wall 121a of a cylinder head 121 to the exhaust port 122 one by one for respective cylinders of the engine 125 in order to achieve promotion of a reflammability of the exhaust gas and has a structure of introducing the secondary air directly to the exhaust port 122.

On the other hand, the secondary air supply path 124 is a path for distributing to supply the secondary air to the secondary air introducing paths 123 and is provided along the side wall 121a of the cylinder head 121.

There are present engines which are provided with and not provided with the secondary air supply apparatus 120, by reason of restraining a fabrication cost in fabricating the engines, there is a case of using a common cylinder head, that is, the cylinder head 121 provided with the secondary air introducing path 123 communicated with the exhaust port 122 at the side wall 121a.

In such a case, in the engine 125 which is not provided with the secondary air supply apparatus 120, as shown by FIG. 6, the secondary air introducing path 123 provided at the cylinder head 121 is opened to an outer side, and the opening portion is sealed by an exhaust manifold gasket 127 interposed between the opening portion and an exhaust manifold 128.

However, the exhaust gas generated at the exhaust port 122 impinges on the exhaust manifold gasket 127 by way of the secondary air introducing path 123, and therefore, there poses a problem that noise is liable to be generated by vibrating the exhaust manifold gasket 127.

Hence, the invention has been carried out in view of the problems and it is an object thereof to provide a gasket which is difficult to generate noise by restraining a vibration in a gasket interposed between a cylinder head and an exhaust manifold of an engine.

SUMMARY OF THE INVENTION

According to an aspect of the invention, there is provided a gasket comprising a gasket main body interposed between a cylinder head and an exhaust manifold of an engine, a base plate affixed to the gasket main body and comprising a heat shielding portion integral with a base portion of the base plate and extending to a side of the exhaust manifold, and a reinforcement plate affixed to the base plate, wherein the reinforcement plate is not present at a region of the base portion in contact with the gasket main body and a reinforcement rib is formed at the region of the base portion in contact with the reinforcement plate and a region of the heat shielding portion in contact with the reinforcement plate.

In this way, the reinforcement plate is fixed to the heat shielding portion extended to the side of the exhaust manifold in a flange-like shape, and therefore, a vibration can be restrained by increasing a rigidity of the heat shielding portion, further, the reinforcement plate is not present at the region on the base portion fixed with the gasket main body, and therefore, a plurality of members in a flat plate shape are not continuously interposed between the cylinder head and the exhaust manifold and a seal performance is not deteriorated. Further, the reinforcement ribs are formed at the regions of the base portion and the heat shielding portion fixed with the reinforcement plate, and therefore, noise can be restrained from being generated by restraining a vibration of the heat shielding portion further effectively.

According to other aspect of the invention, there is provided a gasket comprising a gasket main body interposed between a cylinder head and an exhaust manifold of an engine, and a base plate affixed to the gasket main body and comprising a base portion in contact with the gasket main body, wherein a projected portion provided at the base portion is projected into an introducing path of introducing secondary air from a side wall of the cylinder head to an exhaust port.

In this way, the base portion is provided with the projected portion projected into the introducing port, and therefore, even when an exhaust gas generated at the exhaust port impinges on the base plate constituting the gasket by way of the introducing path, the base plate is difficult to be vibrated and noise can be restrained from being generated. Further, the projected portion is projected into the introducing path, and therefore, the exhaust gas blown out from the introducing path and impinging on the projected portion is easy to be diverged and noise can be restrained from being generated by alleviating an impact in impinging.

According to the invention, there may be constructed a constitution in which the base plate, to which a reinforcement plate is affixed, comprises a heat shielding portion integral with and extending from the base portion to a side of the exhaust manifold, and the reinforcement plate is not present at a region of the base portion in contact with the gasket main body. Thereby, a vibration can be restrained by increasing a rigidity of the heat shielding portion, a plurality of members in flat plate shape are not continuously interposed between the cylinder head and the exhaust manifold of the engine and a seal performance is not deteriorated.

Further, it is preferable that a reinforcement rib is formed between the base portion and the heat shielding portion, and it is further preferable that the reinforcement rib is formed at the regions of the base portion and the heat shielding portion in contact with the reinforcement plate. Thereby, noise can be restrained from being generated by restraining the vibration of the heat shielding portion.

Further, in the invention, it is preferable that a sliding layer including molybdenum disulfide or graphite is formed at least on a surface of the gasket main body facing the exhaust manifold. Thereby, the seal performance is difficult to be deteriorated even when the gasket is thermally deformed by permitting a small amount of sliding the gasket main body relative to the exhaust manifold by the sliding layer.

DETAILED DESCRIPTION OF THE INVENTION

An embodiment of the invention will be explained in reference to the drawings as follows.

Figure 1:
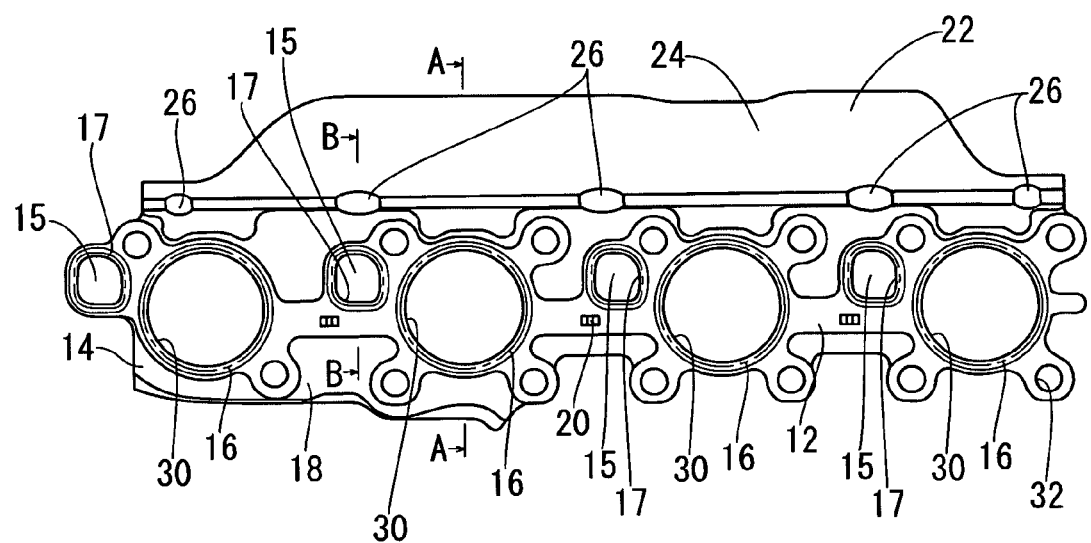
FIG. 1 is a plan view of a gasket according to an embodiment of the invention.
Figure 2:
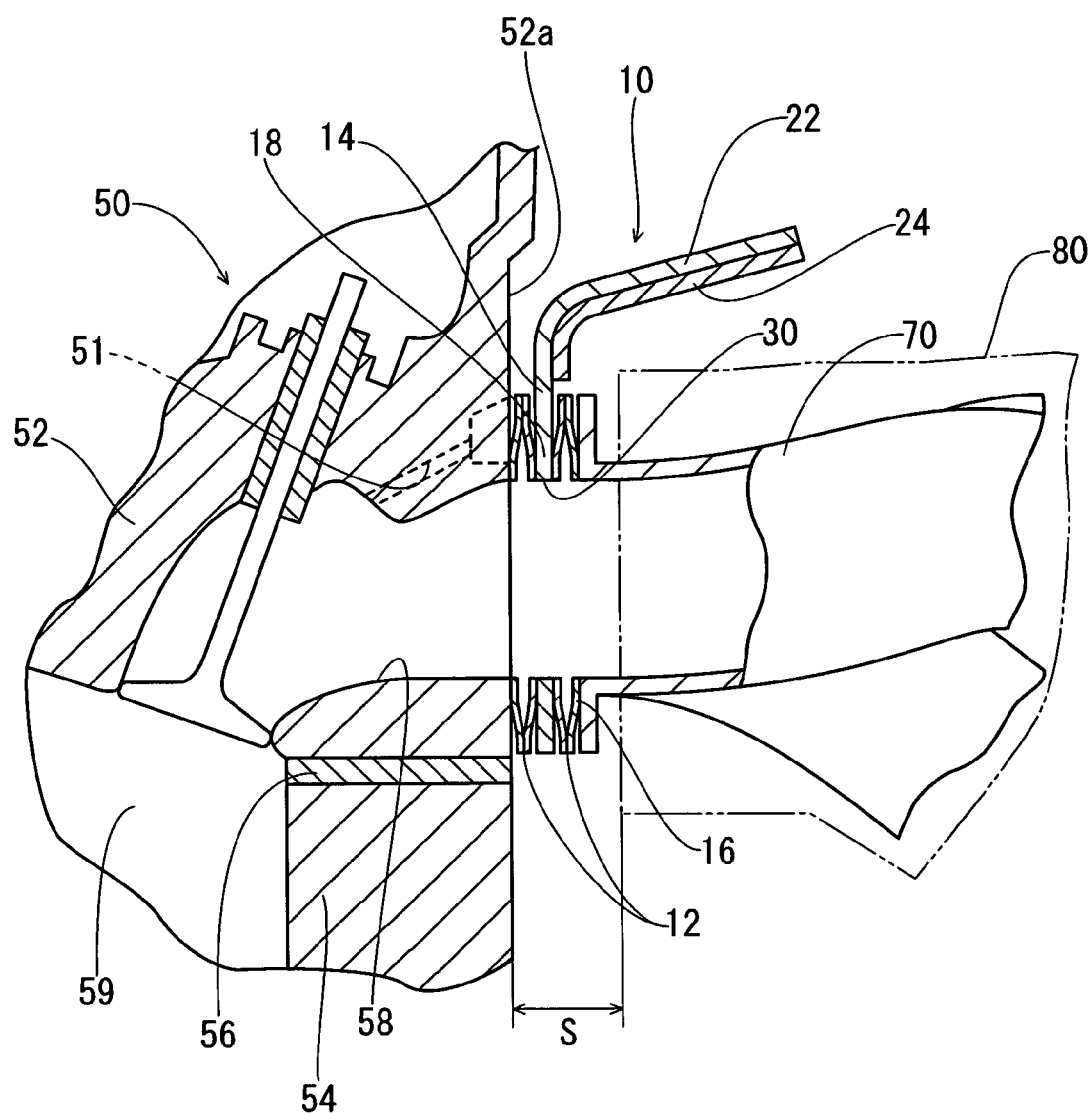
FIG. 2 is a sectional view showing a state of integrating the gasket according to the embodiment of the invention and is a view in correspondence with an A-A section of FIG. 1.
Figure 3:
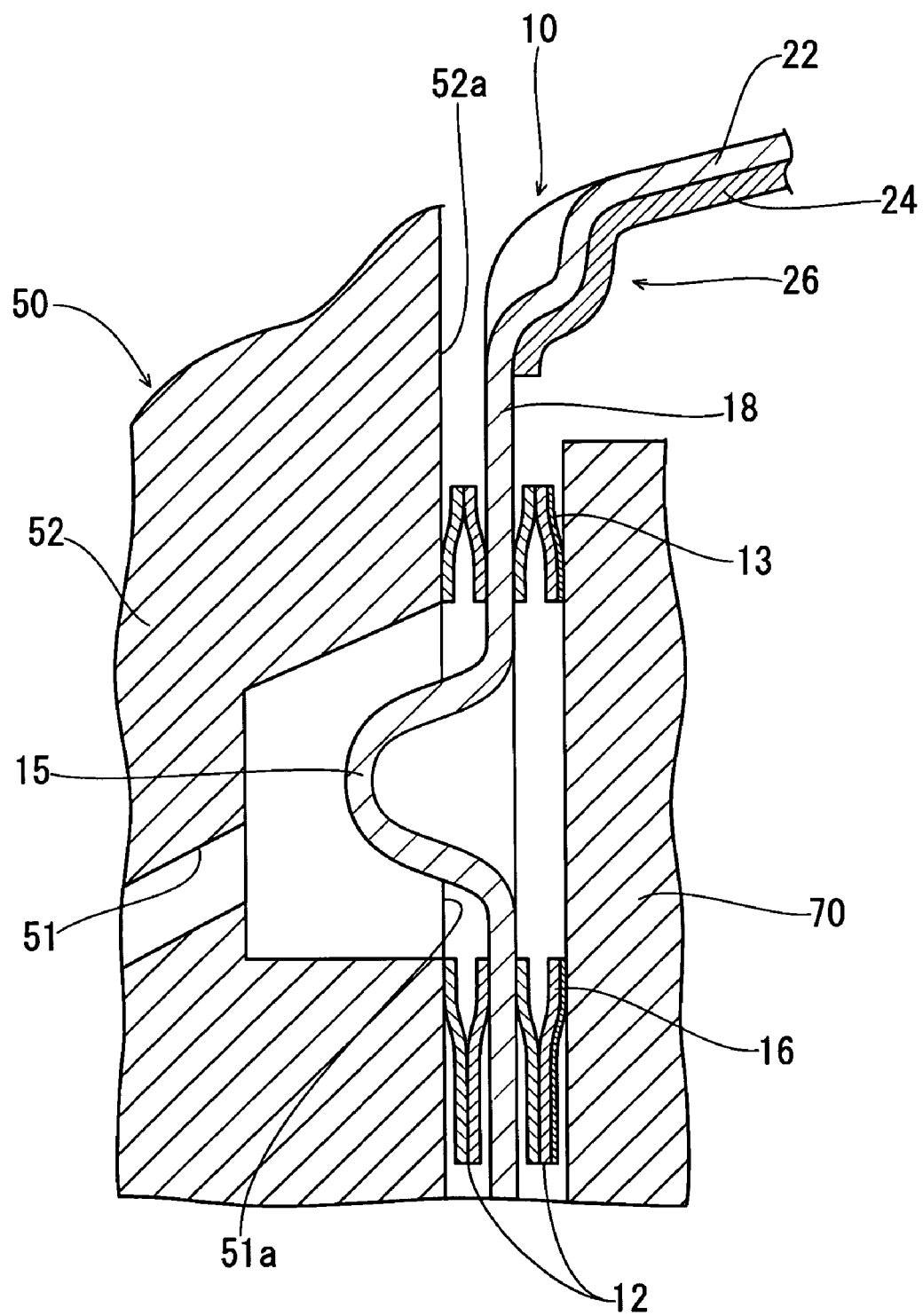
FIG. 3 is a sectional view showing the state of integrating the gasket according to the embodiment of the invention and is a view in correspondence with a B-B section of FIG. 1.
Figure 4:
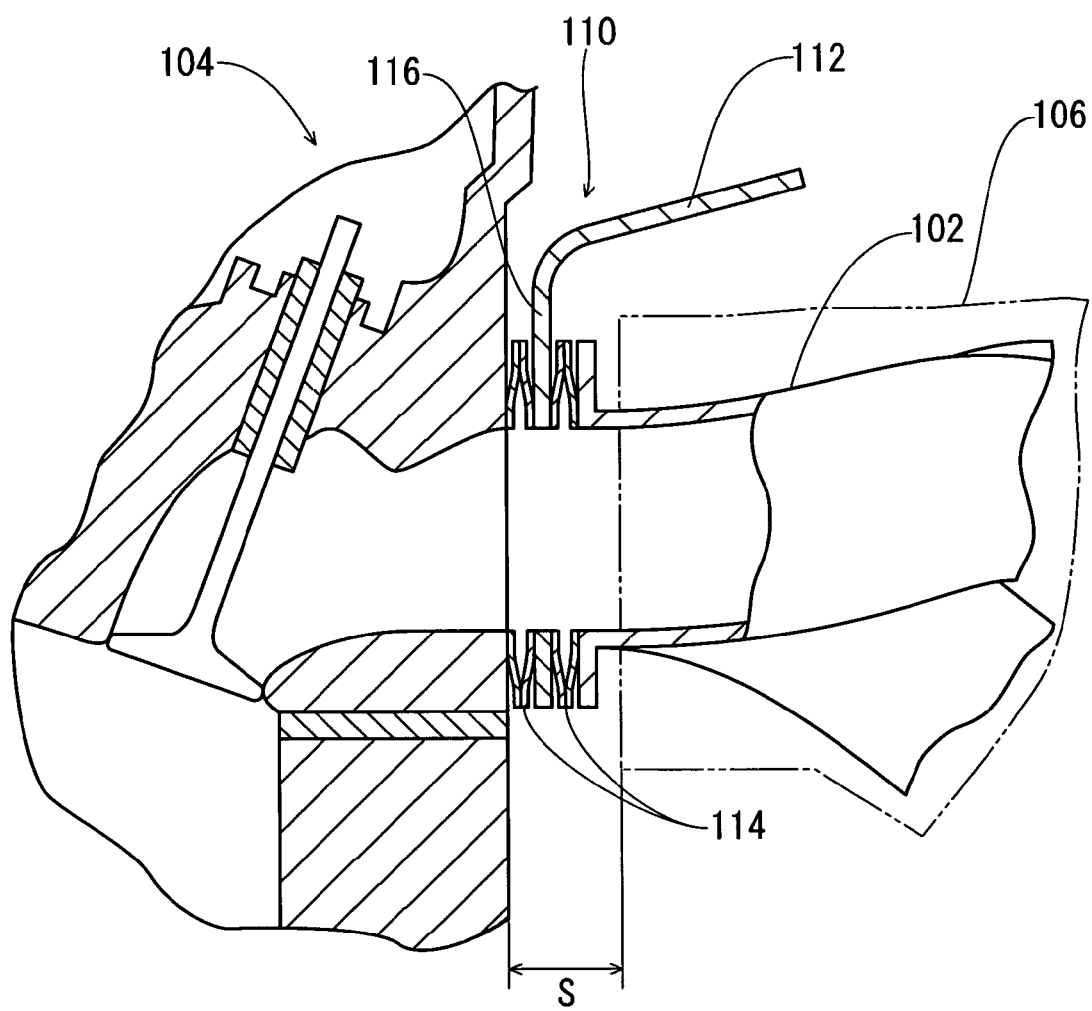
FIG. 4 is a sectional view showing a state of integrating a gasket of a background art.
Figure 5:
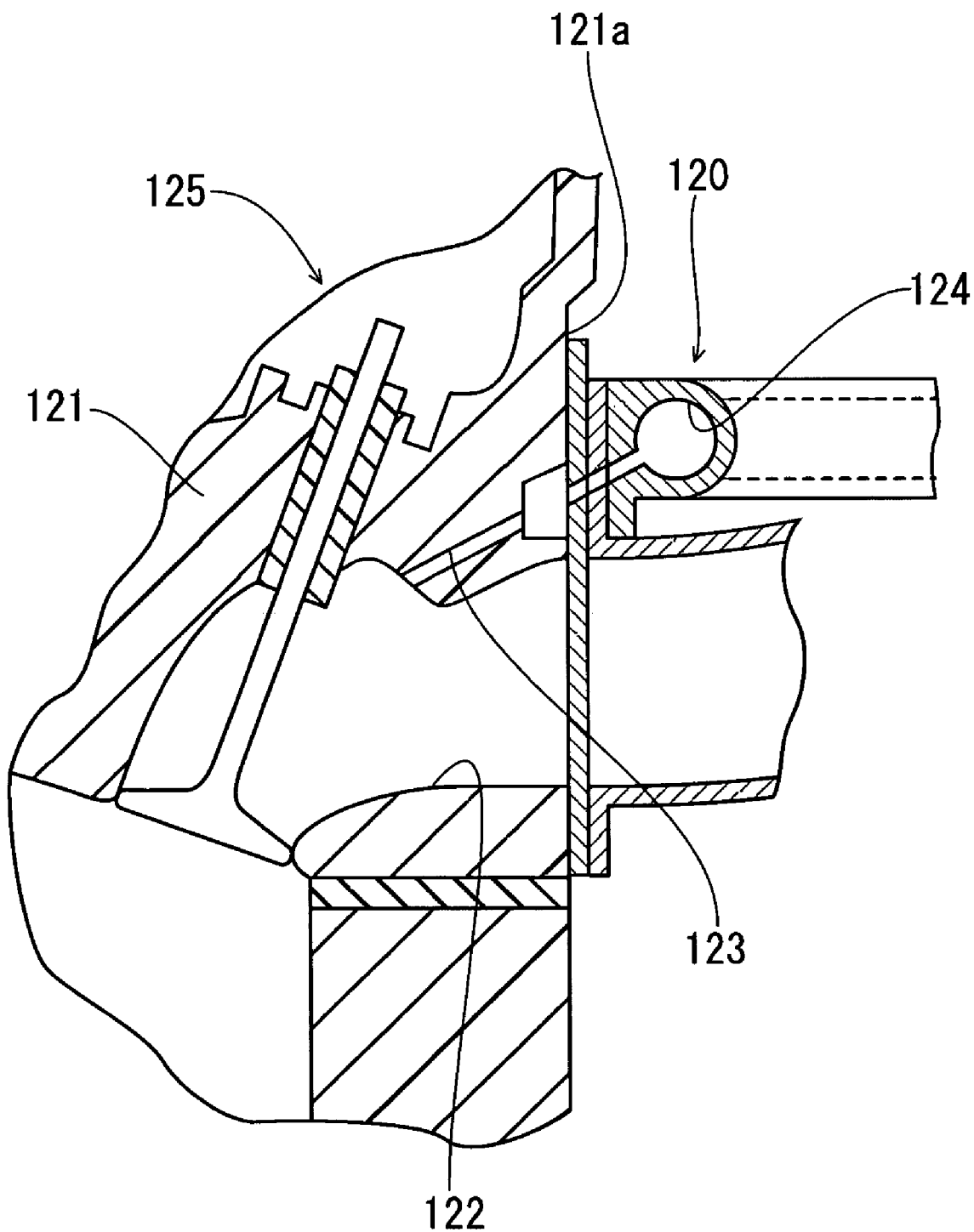
FIG. 5 is a sectional view showing a state of integrating a gasket of the background art.
Figure 6:
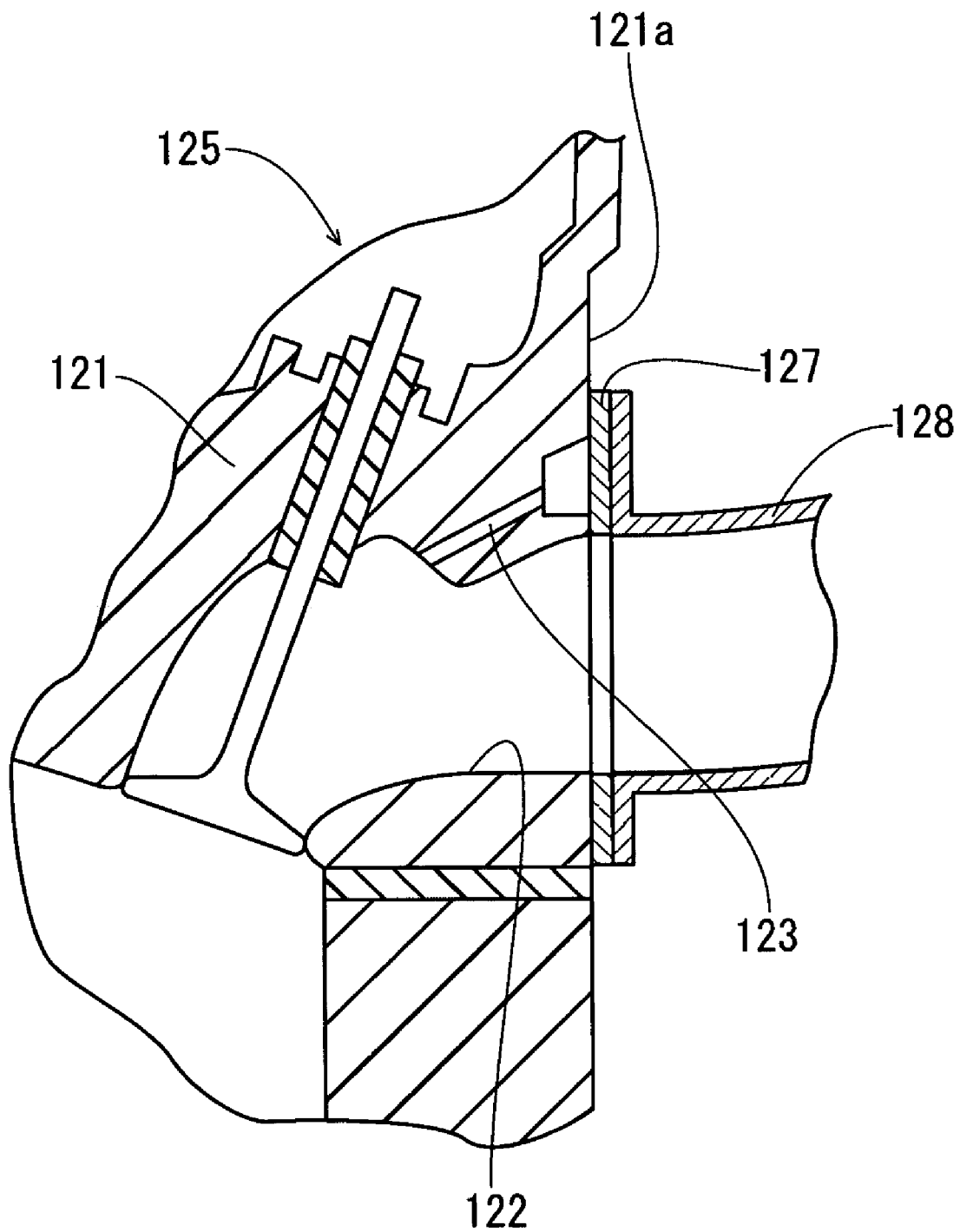
FIG. 6 is a sectional view showing a state of integrating a gasket of the background art.

FIG. 1 is a plan view of a gasket 10 according to an embodiment of the invention, FIG. 2 is a sectional view showing a state of integrating the gasket 10 and is a view in correspondence with an A-A section of FIG. 1, and FIG. 3 is an enlarged sectional view showing an introducing path 51 and a projected portion 15 in the state of integrating the gasket 10 and is a view in correspondence with a B-B section of FIG. 1.

As shown by FIG. 2, the gasket 10 according to the embodiment is an exhaust manifold gasket interposed at a bonding face of a cylinder head 52 and an exhaust manifold 70 of an engine 50.

The engine 50 is constituted by bonding the cylinder head 52 and a cylinder block 54 to each other by interposing a cylinder head gasket 56 therebetween.

The cylinder head 52 is formed with an exhaust port 58 of connecting an exhaust path, and combustion gas (exhaust gas) generated at a combustion chamber 59 is exhausted to outside of the engine 50 by passing the exhaust path. A portion of the exhaust path is constituted by the exhaust manifold 70 fastened to an outer wall face of the cylinder head 52 by a bolt, and as shown by FIG. 2, a surrounding of the exhaust manifold 70 is covered by an insulator 80 to prevent a heat harm to a surrounding. The insulator 80 is fixed to the cylinder head 52 in a state of providing a clearance S for radiating heat between the insulator 80 and the cylinder head 52.

As shown by FIG. 3, the cylinder head 52 is formed with introducing paths 51 penetrated from a side wall 52a thereof to the exhaust ports 58 one by one for respective cylinders of the engine 50.

The gasket 10 is interposed at a bonding face of the cylinder head 52 and the exhaust manifold 70 for restraining the combustion gas from leaking out from a portion of fastening the exhaust manifold 70 to the cylinder head 52 in a procedure of making the combustion gas flow from the exhaust port 58 to the exhaust manifold 70 and sealing an opening portion 51a of the introducing path 51 opened at the side wall 52a of the cylinder head 52.

As shown by FIG. 1, the gasket 10 is formed by laminating together a plurality of sheets of plate-like members formed by a metal material having a heat resistance of, for example, stainless steel or the like, including an exhaust hole 30 in correspondence with the exhaust port 58, and a bolt hole 32 inserted with a bolt for fastening the cylinder head 52 and the exhaust manifold 70, specifically, including a pair of gasket main bodies 12, 12 and a base plate 14 arranged therebetween.

The gasket main body 12 is constituted by laminating one sheet or two sheets of plate members comprising a metal material of stainless steel or the like and preferably formed with a sliding layer 13 including molybdenum disulfide or graphite to cover a surface of at least the gasket main body 12 brought into contact with the exhaust manifold 70 as shown by FIG. 3.

The sliding layer 13 is formed by coating molybdenum disulfide or graphite kneaded with a thermosetting resin of epoxy resin, phenolic resin, polyimideamide resin or the like and a curing agent on the surface of the gasket main body 12 by a method of spray coating, tumbling, dipping or the like to dry and bake.

The sliding layer 13 is provided with a friction coefficient smaller than that of the metal material constituting the gasket main body 12, and therefore, even when the gasket 10 is thermally deformed, the gasket main body 12 is made to be easy to slide relative to the exhaust manifold 70 and a seal performance thereof is difficult to be reduced.

Further, the sliding layer(s) 13 may be formed not only at the face of the gasket main body 12 brought into contact with the exhaust manifold 70 but on both faces of the plate member constituting the gasket main body 12.

The gasket main body 12 is formed with a bead 16 surrounding a surrounding of the exhaust port 30 and formed with a bead 17 surrounding the projected portion 15 formed at the base plate 14 to promote a seal performance by increasing a seal face pressure when the gasket 10 is squeezed by the cylinder head 52 and the exhaust manifold 58.

The base plate 14 includes a base portion 18 fixed with the gasket main body 12 by locking means 20 of a rivet or the like, and a heat shielding portion 22 formed in a flange-like shape integrally from one end edge of the base portion 18, the heat shielding portion 22 is extended in a direction of being remote from the engine 50 by way of the clearance S formed between the cylinder head 52 and the insulator 80 in a state of integrating the gasket 10 to the cylinder head 52 and the exhaust manifold 70 to guide heat generated from the clearance S in the direction of being remote from the engine 50.

As shown by FIG. 3, the base portion 18 is provided with the projected portion 15 projected to a side of the cylinder head 52 at a predetermined position in correspondence with the opening portion 51a opened at the side wall 52a of the cylinder head 52, and the projected portion 15 is projected from the opening portion 51a into the introducing port 51 in a state of integrating the gasket 10 to the engine 50.

The heat shielding portion 22 is fixed with a reinforcement plate 24 and formed with a plurality of reinforcement ribs 26 in order to restrain noise from being generated by a vibration from the engine 50 or the like by increasing a rigidity thereof. The reinforcement plate 24 is folded to bend to be along the base portion 18 at one end portion thereof, and is laminated to fix to substantially an entire region of the heat shielding portion 22 and at least a portion of a region excluding a region of the base portion 18 fixed with the gasket main body by a bonding method of calking, welding or the like. Further, the reinforcement rib 26 is arranged from the base portion 18 over to the heat shielding portion 22 at regions of the base portion 18 and the heat shielding portion 22 fixed with the reinforcement plate 24, and is constituted by a shape of being projected in a direction of extending the heat shielding portion 22 (a direction of being remote from the engine 50).

As described above, in the metal gasket 10 according to the embodiment, the reinforcement plate 24 is fixed to the heat shielding portion 22 extended in the flange-like shape, and therefore, a vibration can be restrained by increasing the rigidity of the heat shielding portion 22. Further, the reinforcement plate 24 is not present at the region fixed with the gasket main body 12 on the base portion 18, and therefore, a plurality of sheets of members in a flat plate shape are not continuously interposed between the cylinder head 52 and the exhaust manifold 70, and the seal performance is not deteriorated.

Further, the reinforcement rib 26 is formed not only at the base plate 14 but at the reinforcement plate 24, and therefore, noise can be restrained from being generated by restraining the vibration of the heat shielding portion 24.

Further, the base portion 18 is provided with the projected portion 15 projected into the introducing path 51, and therefore, even when the exhaust gas generated at the exhaust port 58 impinges on the base plate 14 constituting the gasket 10 by way of the introducing path 51, the base plate 17 is difficult to be vibrated and noise can be restrained from being generated. Further, the projected portion 15 is projected into the introducing path 51, and therefore, the exhaust gas blown from the introducing path 51 and impinging on the projected portion 15 is easy to be diverged and noise can be restrained from being generated by alleviating an impact in impinging.

What is claimed is:

1. A gasket comprising: a gasket main body interposed between a cylinder head and an exhaust manifold of an engine; and a base plate affixed to the gasket main body,
   wherein the base plate comprises a base portion including a base portion region in contact with the gasket main body, a heat shielding portion integrally formed and extended from the base portion to a side of the exhaust manifold, and a reinforcement plate laminated to an area of the base portion and the heat shielding portion, and
   wherein said area does not include the base portion region that is in contact with the gasket main body, part of the heat shielding portion is formed into a reinforcement rib, and said area includes the reinforcement rib.

2. A gasket comprising a gasket main body interposed between a cylinder head and an exhaust manifold of an engine, and a base plate affixed to the gasket main body and comprising a base portion including a region in contact with a region of the gasket main body;
   wherein a projected portion provided at the base portion is projected into a path for introducing secondary air from a side wall of the cylinder head to an exhaust port.

3. The gasket according to claim 2,
   wherein the base plate comprises a base portion including a base portion region in contact with the gasket main body, a heat shielding portion integrally formed and extended from the base portion to a side of the exhaust manifold, and a reinforcement plate laminated to an area of the base portion and the heat shielding portion, and
   wherein said area does not include the base portion region that is in contact with the gasket main body, part of the heat shielding portion is formed into a reinforcement rib, and said area includes the reinforcement rib.

4. The gasket according to claim 3, wherein the reinforcement rib extends from the base portion to the heat shielding portion.

5. The gasket according to claim 1, wherein a sliding layer including molybdenum disulfide or graphite is formed at least on a surface of the gasket main body facing the exhaust manifold.

6. The gasket according to claim 2, wherein a sliding layer including molybdenum disulfide or graphite is formed at least on a surface of the gasket main body facing the exhaust manifold.

* * * * *